United States Patent [19]

Bowman

[11] 4,033,372

[45] July 5, 1977

[54] FIRE HYDRANT LOCKING DEVICE

[76] Inventor: Harold M. Bowman, 29355 Ranney Parkway, Cleveland, Ohio 44145

[22] Filed: June 16, 1976

[21] Appl. No.: 696,757

[52] U.S. Cl. ................................ 137/296; 81/90 C; 137/382

[51] Int. Cl.² ........................................ F16K 35/06

[58] Field of Search ......... 137/272, 294, 296, 377, 137/382, 382.5; 251/291, 292; 81/90 C

[56] References Cited

UNITED STATES PATENTS

| 2,118,233 | 5/1938 | Ruggio | 137/296 |
| 3,929,152 | 12/1975 | Graham | 137/296 |
| 3,935,877 | 2/1976 | Franceschi | 137/296 |

*Primary Examiner*—William R. Cline
*Assistant Examiner*—Richard Gerard
*Attorney, Agent, or Firm*—Baldwin, Egan, Walling & Fetzer

[57] ABSTRACT

A fire hydrant locking device is disclosed for preventing undesirable tampering, such as turning on the water release at the fire hydrant. The device consists of an imperforate dome encompassing and rotatably attached to a spider which in turn is secured to a known type of fire hydrant. Inside of the apex of the dome is a recess snugly fitting the nut which controls the opening and closing of the water supply through the hydrant. The dome can be rotated, thus turning on the water, only by use of a special wrench which fits into receiving recesses formed on the outer face of the dome.

8 Claims, 6 Drawing Figures

FIRE HYDRANT LOCKING DEVICE

BACKGROUND OF THE INVENTION

In major urban areas there is a critical loss of adequate water pressure to maintain the fire-fighting hydrant system, due to vandalism of the fire hydrants. Persons are constantly opening the fire hydrants to provide the nearby residence with cooling water, resulting in severe loss of fire hydrant water pressure. The present invention is to provide a bullet-shaped locking head that will replace the top of an existing fire hydrant and which will be turned on only by means of a special wrench.

An object of the present invention is to provide a locking device having a small number of parts and which is easily attached to an existing fire hydrant and which can be operated to turn on the water in the hydrant only by use of a special wrench.

Another object of the present invention is to provide an imperforate, bullet-shaped dome encompassing, and rotatably attached to, a spider having legs by which it is easily attached to an existing hydrant. The dome has at its apex a recess having a non-circular opening adapted to snugly fit the operating nut of the hydrant structure of the fire plug.

Other objects and advantages of this invention will be apparent from the accompanying drawings and specification and the essential features thereof will be set forth in the appended claims.

In the drawings,

FIG. 5 is a top elevational view of the same; while

Figure 1:
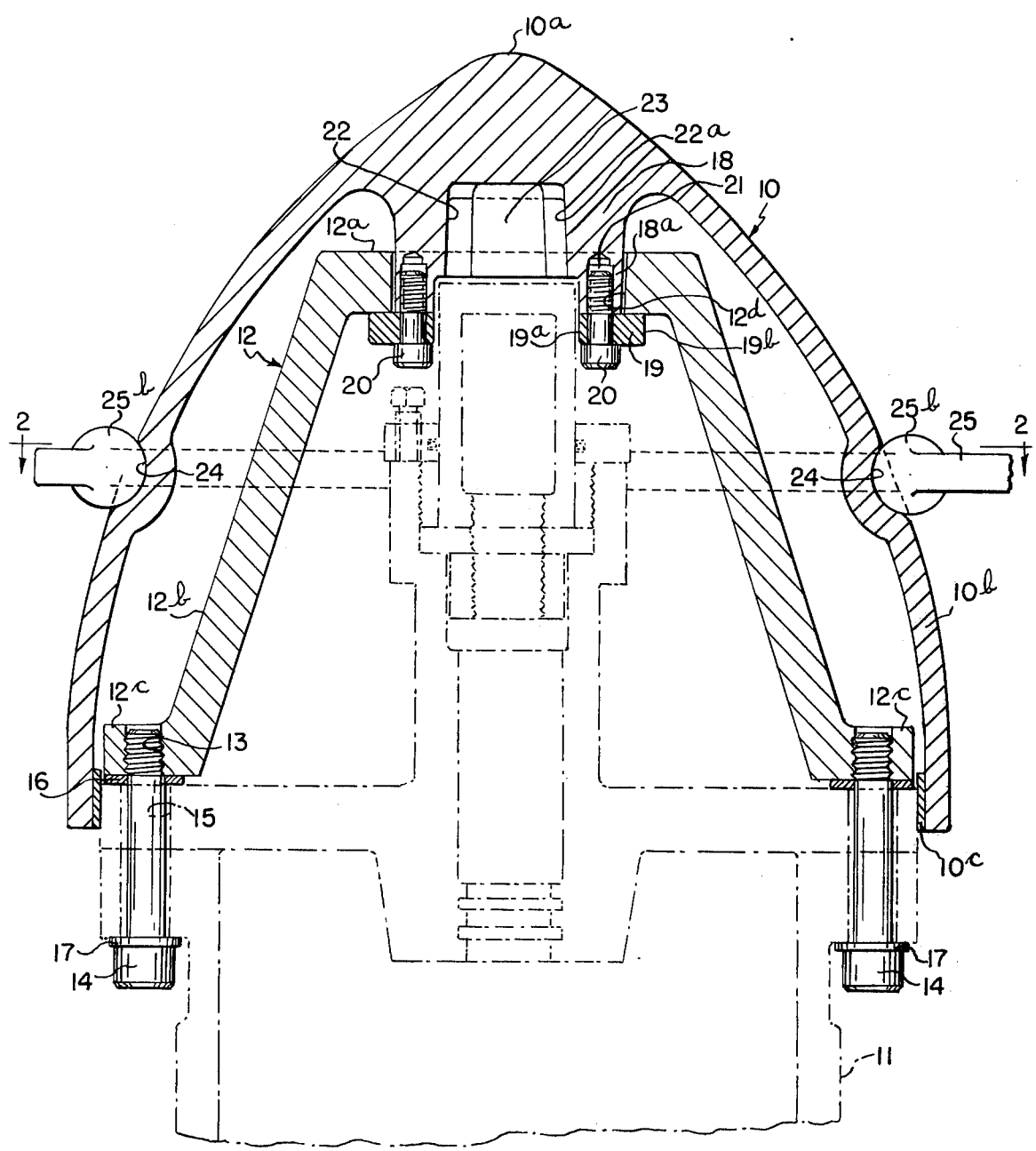
FIG. 1 is a central sectional view through the structure of this invention in assembled position on a fire plug of known type which is shown in the Figure in dot-dash lines.

This invention utilizes a dome 10 covering the operating structure of this invention. In one embodiment of this invention, shown in the drawings, the dome is generally bullet-shaped having an apex at 10a and having a downwardly extending skirt 10b which, at 10c snugly fits around the fire plug structure 11. Preferably, an annular sealing gasket 10c extends around the lower edge of the skirt at the position 10c in FIG. 1. In the operating position of the parts shown in FIG. 1, a spider 12 fits inside the dome 10 and has a top 12a from which extend integrally a plurality of legs 12b, four being shown in the present embodiment. The lower end of each leg 12b turns outwardly at 12c to provide a foot and each of these is provided with a threaded opening 13 to receive a socket headed cap screw 14 which passes upwardly through a suitable provided opening 15 in the hydrant structure 11. A rubber washer is shown at 16 between each foot and the fire hydrant, and a brass washer is shown at 17 between the screw head and the fire hydrant.

The dome 10 is rotatably mounted on the spider 12. This comprises a downwardly extending enlargment 18 inside the dome near it apex. This terminates at its lower end 18a in a circular projection which is axially of the dome and adapted to just extend through and to rotate inside the circular opening 12b in the spider top. A retaining ring 19 has an inside diameter 19a approximately the same as the opening 12d and the ring is removably secured to the circular projection 18a by means of a plurality of socket head cap screws 20. These pass through suitable openings in the ring 19 and upwardly into registering threaded openings 21 in the circular extension at 18a. The bottom surface on the circular projection 18a is flat and the top surface of the retaining ring 19 is flat so that the parts provide for smooth rotation of the dome head relative to the spider. It will be noted in FIG. 1 that the retaining ring 19 has an outside diameter 19b which is greater than the diameter of the opening 12b. Thus, the dome and spider are quickly assembled by first securing the retaining ring by means of cap screws 20, and then placing the dome 10 in position and securing the spider by means of the cap screws 14.

The enlargement 18 has a central recess 22 which is axially of the dome 10 and opens downwardly. At its upper end 22a, the recess 22 has a non-circular opening adapted to snugly fit the operating nut 23 of the fire hydrant.

Figure 2:
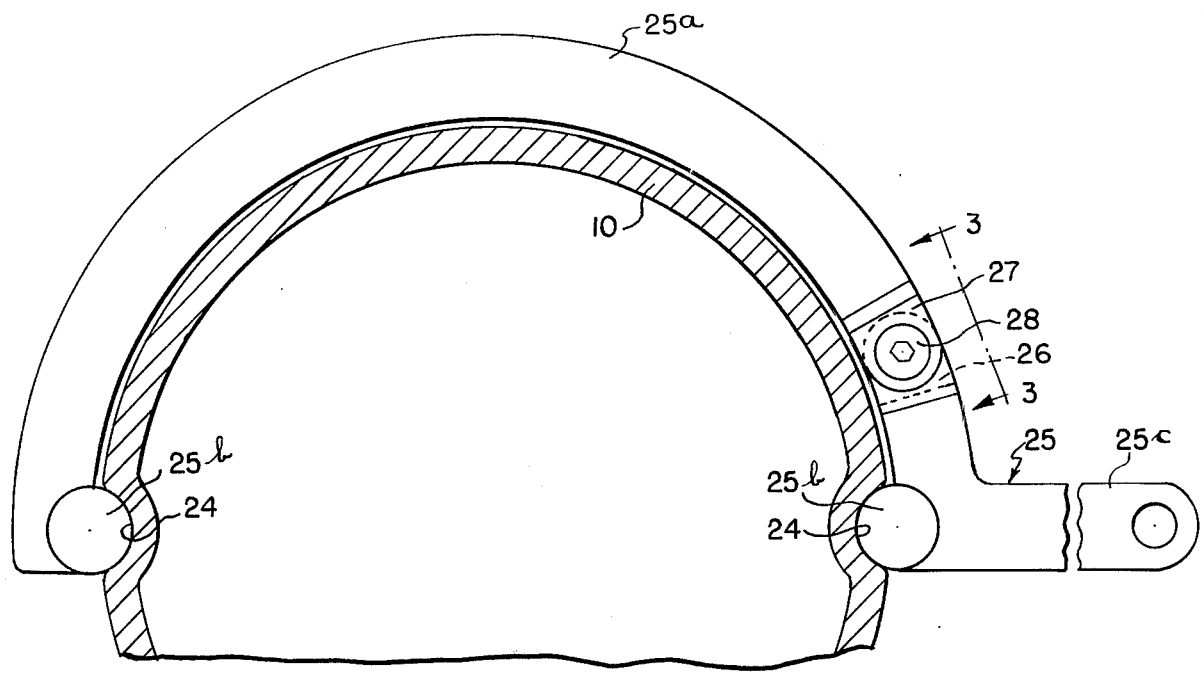
FIG. 2 is a partial sectonal view taken along the line 2—2 of FIG. 1 and showing only parts of the dome and the special operating wrench.
Figure 3:
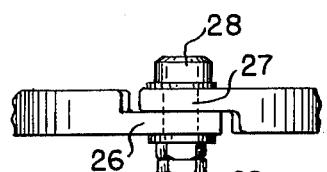
FIG. 3 is a fractional elevational view taken along the line 3—3 of FIG. 2 and slightly reduced in size.
Figure 4:
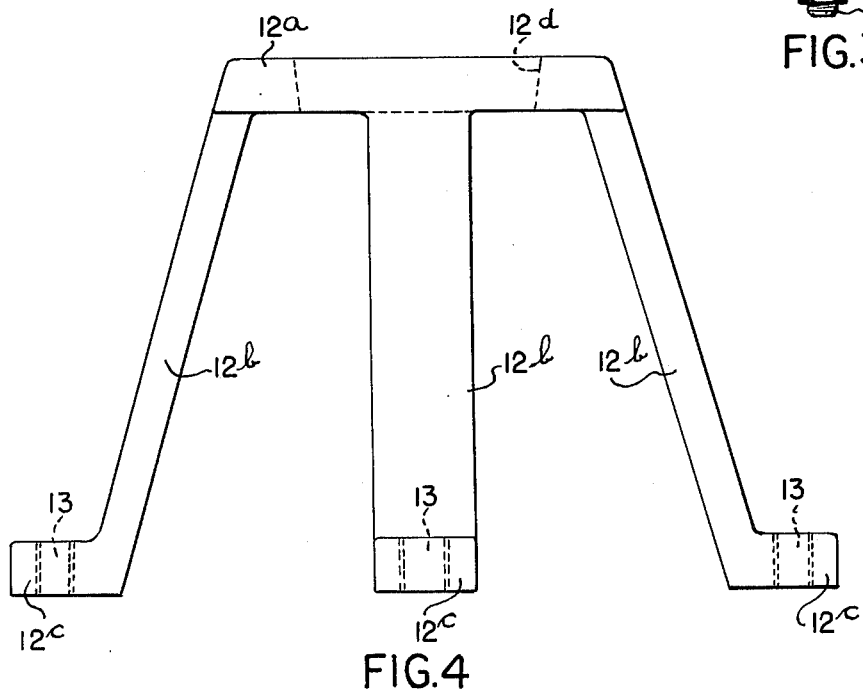
FIG. 4 is an elevational view of the spider shown in FIG. 1.
Figure 5:
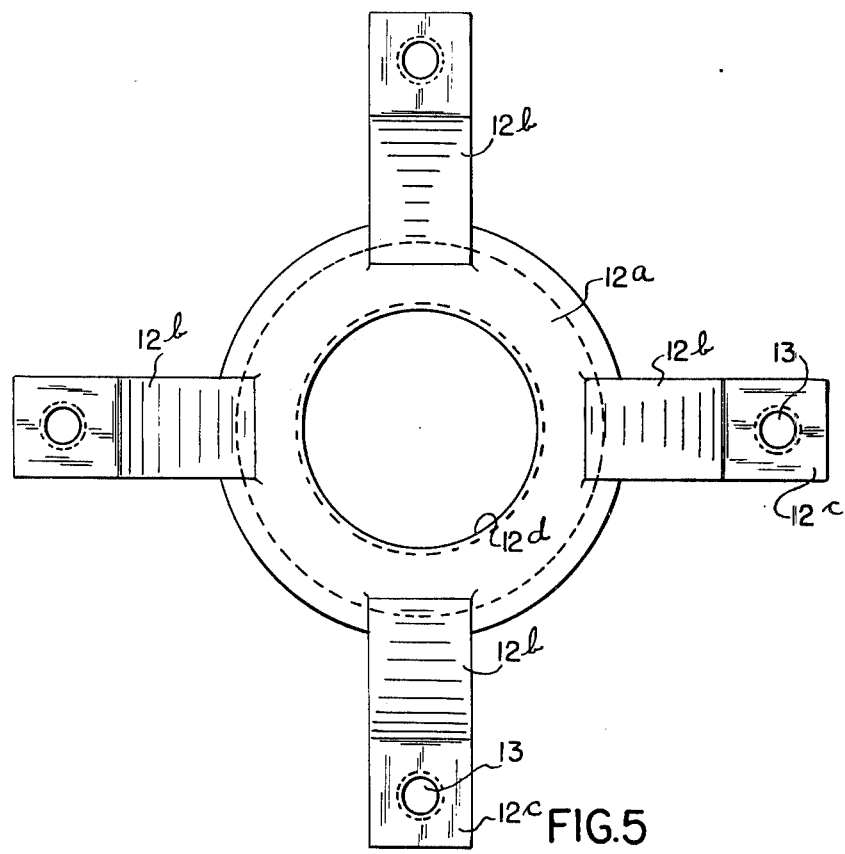
Figure 6:
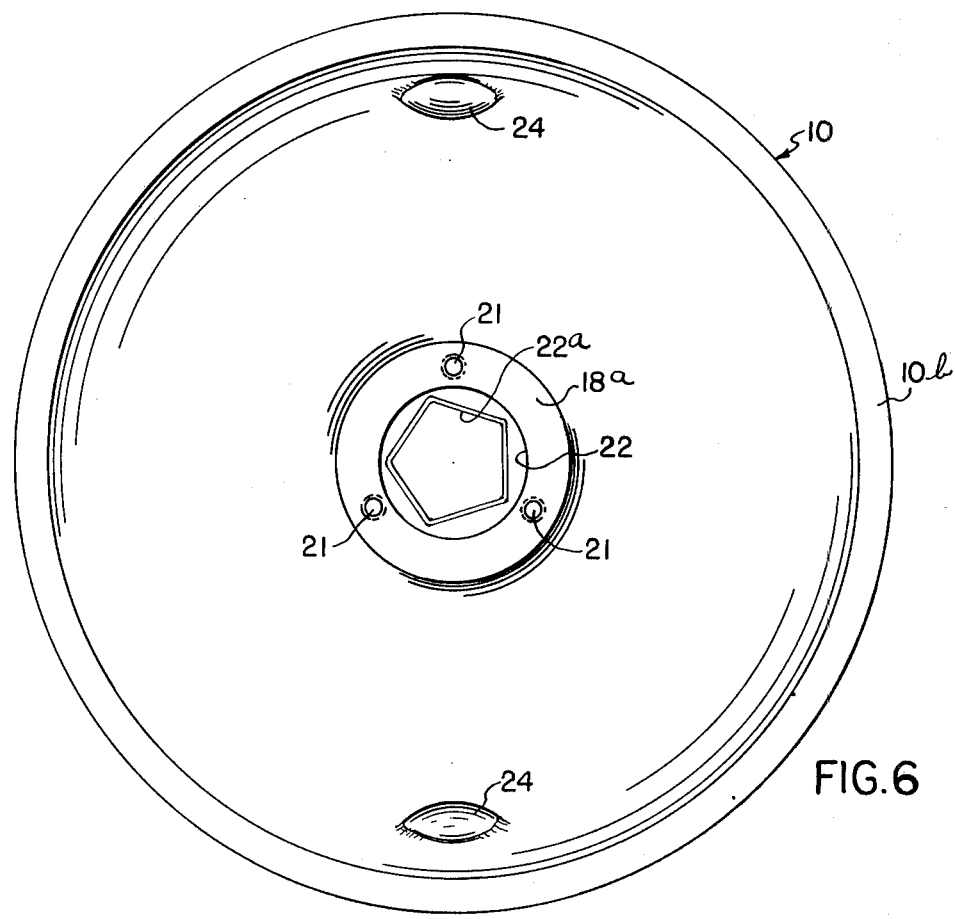
FIG. 6 is a bottom plan view of the dome shown in FIG. 1.

The dome 10 is arranged in such a fashion that it can only be rotated by use of a special operating wrench. As seen in FIGS. 1 and 2, the dome is provided with a plurality of inwardly extending, wrench-receiving recesses 24 located at a common level on the dome and part way down the skirt of the dome. In the embodiment shown, two of such recesses 24 are shown which are diametrically opposite each other and are arcuately shaped. To rotate the dome 10, in order to turn on the water, a special wrench is necessary. Such a wrench is shown at 25 in FIGS. 1 and 2. This wrench is generally semi-circular as indicated at 25a adapted to fit around the outside of the dome 10 at the common level of the recesses 24. The tool has projections 25b adapted to fit into the recesses 24. In this embodiment, the surfaces on the projections 25b, and the surfaces 24 of the recesses, are closely fitting arcs. The tool 25 has an actuating handle 25c. In order for the tool shown herewith to reach the operating position shown in FIGS. 1 and 2, it is necessary to pass the projections 25b over the surface of the dome 10, since the tool shown herewith is of general rigid structure, it is necessary to separate the projections 25b slightly to reach the final operating position. For this purpose, an articulating connection is shown in FIGS. 2 and 3. This comprises a flattened end 26 on the larger portion of the tool overlapping a flattened end 27 on the larger portion of the tool, and these two parts are fastened together by a bolt and nut combination 28. This bolt and nut combination may be loosened while the tool is being placed in the position of FIG. 2 and then the bolt and nut combination 28 is tightened.

The dome part 10 and the spider part 12 may be made of any rigid material but the embodiment shown here used ductile iron castings for both parts.

In the use of this invention, it will be apparent that when the operating nut 23 of the fire hydrant is tightly closed, hand pressure on the dome 10 gives insufficient leverage to loosen the operating nut 23. Thus, it is necesssary to have the special wrench shown in FIG. 2 if one wishes to open the water flow in the fire hydrant.

What is claimed is:

1. A fire hydrant locking device comprising a rigid spider having a top and a plurality of downwardly extending legs integral with said top at the periphery thereof, each of said legs terminating in a foot adapted to be firmly attached to a fire plug of known type, there being a central circular opening through said spider top, a dome encompassing said spider having a downwardly extending annular skirt of a size to fit snugly around said fire plug, said dome being imperforate and having an apex, said dome having a plurality of inwardly extending wrench-receiving recesses located at a common level part way down the skirt of said dome, having at its apex a downwardly extending enlargment terminating at its lower end in a circular projection axially of said dome and adapted to just extend through and to rotate inside said circular opening in said spider top, said circular projection having a flat bottom surface, a retaining ring having a flat top and being of an outside diameter greater that of said circular opening and adapted to abut said spider top and having an inside diameter permitting attachment to the bottom of said circular projection, removable means for such attachment, and said enlargement having an axial central recess opening downwardly, said last named recess terminating at its upper end in a non-circular opening adapted to snugly fit the operating nut of the hydrant structure of said fire plug, whereby said hydrant may be turned in an opening direction only by a special wrench having projections arranged to fit in said wrench-receiving recesses to rotate said dome.

2. A fire hydrant locking device as defined in claim 1, wherein said dome is generally bullet-shaped.

3. A fire hydrant locking device as defined in claim 2, wherein said wrench-receiving recesses are about three-fifth of the distance down said skirt from said apex.

4. A fire hydrant locking device as defined in claim 3, wherein two of said wrench-receiving recesses are diametrically opposite and are arcuately shaped.

5. A fire hydrant locking device as defined in claim 4, including as said special wrench, a semi-circular tool adapted to fit around the outside of said dome at said common level, and having said projections on the opposite ends of said tool with shapes complementary to said recesses.

6. A fire hydrant locking device as defined in claim 1, wherein there are four of said spider legs sloping downwardly and outwardly from said top of said spider.

7. A fire hydrant device as defined in claim 1, wherein said spider feet have threaded openings adapted to receive bolts.

8. A fire hydrant locking device as defined in claim 1, wherein said removable means for attachment of said retaining ring to said circular projection of said dome comprises a plurality of holes provided in said ring and registering threaded holes in said circular projection, and headed bolts passing upwardly through said holes in said retaining ring and into said threaded holes.

* * * * *